Sept 8, 1925.

C. F. ECKART 1,553,035

MEANS FOR ENHANCING THE GROWTH OF PLANTS

Filed Dec. 3, 1923

Inventor:
Charles F. Eckart
by Harrison F. Lyman
Atty.

Patented Sept. 8, 1925.

1,553,035

UNITED STATES PATENT OFFICE.

CHARLES F. ECKART, OF HONOLULU, TERRITORY OF HAWAII.

MEANS OF ENHANCING THE GROWTH OF PLANTS.

Application filed December 3, 1923. Serial No. 678,133.

*To all whom it may concern:*

Be it known that I, CHARLES F. ECKART, a citizen of the United States, residing in the city of Honolulu, Territory of Hawaii, have invented certain new and useful Means for Enhancing the Growth of Plants; and I do hereby declare the following to be a full, clear, and exact description of the invention, such as will enable others skilled in the art to which it appertains to make and use the same.

The invention relates to a form of mulching which is adapted to enhance the growth of plants of various kinds, and to this end the invention comprises the provision of a sheet, strip or elongated section of paper, felt or fabric treated with asphalt, tar or the like, so as to render the device water-resistant and capable of absorbing relatively large quantities of solar heat, and transmitting the same into the soil, and to increase the resistance of the material to weathering influences.

The mulching sheet is also preferably provided with numerous small perforations, disposed throughout its area, to permit water, applied to the surface of the sheet by natural or artificial means, to drain or seep through the device into the underlying soil. The perforations are of such form as to permit the ready drainage of water from the upper surface of the sheet while preventing almost to a maximum degree the emergence of weeds through them. They are likewise of such form or nature as to reduce to a practical minimum the evaporation of water from the soil surface underlying the mulching sheet.

The particular form of mulching device comprising the invention, to which this application relates, is an advanced step beyond that described in my Letters Patent No. 1,382,069 issued June 21, 1921, and that referred to in my Letters Patent Reissue No. 15,231, reissued November 22, 1921, inasmuch as special means are provided to reduce evaporation of moisture from the soil surface and to suppress the growth of weeds to a degree which is substantially greater than that effected in the inventions covered by said patents.

The invention comprises a sheet or strip, as aforesaid, which is preferably formed of dark colored asphalt-treated material and which has disposed at spaced intervals throughout its area, or a substantial part of its area, numerous relatively small drainage openings formed by intersecting incisions or rents or by punctures made in such manner that the flap-like elements, so produced, may, when adjusted so as to conform with the plane of the sheet, close the respective openings. When the openings are thus closed they are pervious to water owing to the flexibility and hinge-like character of the small flaps or burrs which do not tightly seal the drainage outlets, while they are practically impervious to weeds which find the flap-like projections an obstacle to their emergence through the sheet. Likewise the small flaps or burrs act as an effective means of reducing evaporation to a degree which is not obtainable with clear unguarded openings. In the forming of the drainage openings, during the manufacture of the device, the small intersecting incisions or punctures are made through a rending operation in which pressure is exerted on one side of the surface of the sheet and it is this side of the sheet which should lie uppermost, when the sheet is superimposed on the ground, in order that the flap-like elements may have their hinge-like movement in a downward direction, their torn and thus roughly beveled margins precluding their elevation above the plane of the upper surface of the sheet.

For optimum results with respect to the drainage of water through the perforations in the mulching sheet, the latter should comprise a layer of asphalt or similar material, or a layer of paper or fibers impregnated or treated with such material, interlaid between two layers of unimpregnated and preferably dark colored paper so that the body of the mulching device is similar in character to certain of the common case-lining or similar papers procurable in the market.

One of the external layers of unimpregnated fibres may, however, be omitted, the mulching device in such case consisting of a layer of asphalt or similar material or a layer of paper or fibres impregnated or treated with such material, and a layer of non-asphalt impregnated fibres. It is desirable that the layer of non-asphalt impregnated fibres which is to be exposed to the sunlight should be dark in color so as to absorb the heat of the sun. In my investigations I have found that material of this nature offers the following special advantages, viz: (a) the asphalt in the flap-like elements, projecting from the margins of the drainage outlets, does not cause these elements to seal too closely through adhesion the drainage perforations when the mulching sheets are wound in rolls in the course of manufacture; (b) a greater expansion of certain of the fibers in the mulching sheet results from the wetting of the material than occurs in the case of ordinary asphalt-saturated or coated felts and papers, and this temporary increased extension of the fibers under such conditions is of particular advantage through the resulting wrinkled surface imparted to the mulching device. These surface irregularities permit less water to drain off the margins of the sheet than is the case where the surface is comparatively smooth, and a larger proportion of the applied water thus passes through the drainage perforations into the soil underlying the sheet; (c) a smaller opening suffices for the drainage of water through the material than is the case when ordinary asphalt-saturated or coated papers are employed; (d) there is less tendency for the succulent stems, leaves or tendrils of certain plants to become burned or injured through contact with the surface of the sheet when the latter is exposed to a hot sun, because of the superficial layer of unimpregnated fibres which prevents direct contact of the plant with the heated asphaltic material.

In the application of the invention the mulching strips above described are laid between the plant rows in flat surface contact with the ground or they may be superimposed on the plant bed before or after the plants, or the plant-producing stocks, are set out. If they are laid on the plant bed it is necessary, of course, that suitable openings to accommodate the plants be formed in the mulching sheet.

The invention and the mode of applying it are diagrammatically illustrated in the accompanying drawings.

Figure 1:
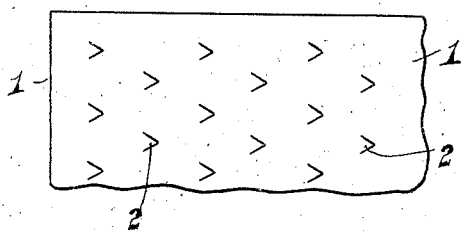
Figure 1 is a fragmental view illustrating a portion of the mulching sheet.
Figure 2:
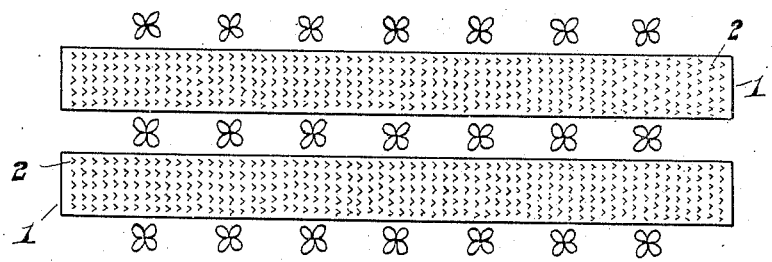
Fig. 2 is a view illustrating the mulching strips lying between the rows of plants.
Figure 3:
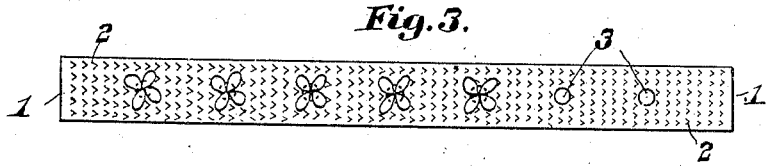
Fig. 3 is a view illustrating the mulching strip superimposed on the plant bed.
Figure 4:
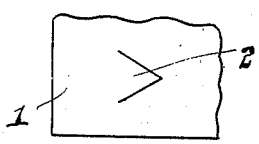
Figs. 4, 5, 6 and 7 illustrate a number of the various forms of drainage openings applicable to the mulching device.
Figure 5:
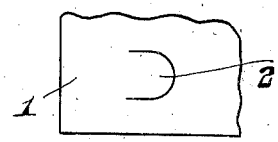
Figure 6:
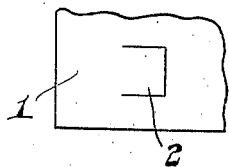
Figure 7:
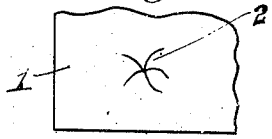
Figure 8:
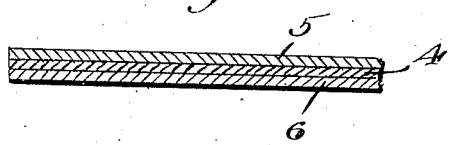
Fig. 8 is an enlarged cross-sectional view of a type of paper adapted for use in the mulching device.

Referring to the drawings, Fig. 1 shows the manner in which the drainage perforations 2 may be disposed throughout the area of the mulching sheet 1. In this case they are V-shaped and in rows which are in staggered relation to those which are next adjacent. These drainage perforations are of a smaller order of magnitude than such as would be suitable for planting openings, and for maximum efficiency they are made by a rending or tearing operation instead of by a clean cut, the rents being preferably from ¼ inch to ¾ inch in length. Of course other arrangements of the drainage perforations may prove equally effective and it is not intended that their disposition shall be confined to any particular manner or series nor that the individual openings shall necessarily conform to any particular shape. Fig. 2 illustrates three rows of plants with the mulching device 1 superimposed on the surface of the ground between the rows of plants. Fig. 3 shows a row of plants with the mulching device 1 superimposed on the plant bed; the drainage perforations are indicated by 2, and the relatively large holes or planting openings to accommodate the plants or planting stock by 3. Figs. 4, 5 and 6 illustrate a few modifications in the shape of the drainage perforations 2. In Fig. 7 a small section of the mulching device 1 is shown with a punctured drainage opening 2 of irregular outline and which comprises several flap-like elements so formed that when their free ends come together the opening is essentially closed except for the fissure-like rents by which the opening was produced. Fig. 8 is an enlarged cross-sectional view showing a type of paper which I propose to use in the mulching sheet, the same consisting of an inner layer 4 of asphalt or asphalt-impregnated fibres and two outer layers, 5 and 6 respectively, of fibres not impregnated with asphalt. It is understood, of course, that any of the layers of fibres may be composed of more than one ply of paper, the term "layer" in this connection being used in a broad and not in a restricted sense.

The disposition of the mulching device between the plant rows or on the plant beds results in the suppression of weed growth to a maximum degree, owing to the blanketing effect of the body of the sheet and the practically impenetrable barrier against weed emergence afforded by the flap-like appendages to the drainage perforations or outlets. Water applied naturally or artificially to the upper surface of the devices seeps through the drainage openings into the underlying soil, where it becomes trapped and is held available for the use of the plants with a minimum loss from soil-surface evaporation. The wrinkling of the mulching sheet when it becomes wet, particularly when the preferred form of paper above described is used, causes irregularly dispersed ridge-like elevations and corresponding depressions to form throughout its area which reduce substantially the drainage of water from the margins of the sheet and cause the greater part to drain or seep through the openings made for the purpose. The heat-absorbing character of the mulching sheet results in an increased and desirable degree of heat in the soil adjacent to or surrounding the plants, thereby increasing the activity of the beneficial soil bacteria, and the solvent action of the soil water, and hence the available supply of plant food, and the mulching sheet otherwise serves as an important factor in the creation of favorable influences for the substantial enhancement of plant development.

What I claim is:—

1. A means for enhancing the growth of plants comprising a sheet of flexible material having relatively small drainage opening distributed through the body thereof and flaps cooperating with said openings having marginal edge portions extending beyond and underlying the marginal edges of said openings.

2. A means for enhancing the growth of plants comprising a sheet of flexible material having relatively small drainage openings distributed through the body thereof and integral flaps cooperating with said openings having marginal edge portions extending beyond and underlying the marginal edges of said openings.

3. A means for enhancing the growth of plants comprising a flexible sheet containing a heat-absorbing medium and having relatively small drainage openings distributed through the body thereof, said openings consisting of rents or tears so produced that the marginal edges of the concomitant flaps underlie the marginal edges of the openings and said flaps are maintained in depressed relation to the adjacent upper surface of the body of the sheet.

4. A means for enhancing the growth of plants comprising a sheet of flexible material having relatively small V-shaped rents or tears and cooperating flaps distributed through the body thereof, said flaps having marginal edge portions extending beyond and underlying the marginal edges of said openings.

5. A means for enhancing the growth of plants comprising a flexible sheet having relatively small drainage openings distributed through the body thereof, said openings being guarded by upwardly closing flap-like weed-suppressing elements.

6. A means for enhancing the growth of plants comprising a flexible sheet having relatively small drainage openings distributed through the body thereof, said openings consisting of rents or tears so produced as to form concomitant projections which are maintained in depressed relation to the upper surface of the body of the sheet.

7. A means for enhancing the growth of plants comprising a flexible sheet having relatively small V-shaped rents or tears for drainage distributed through its body, said rents or tears being so produced as to form resulting projecting elements which are maintained in depressed relation to the adjacent upper surface of the body of the sheet.

8. A means for enhancing the growth of plants comprising a flexible sheet containing a layer of waterproofing material and having on at least one surface a layer of fibrous fabric, said sheet having relatively small drainage openings distributed through the body thereof, and upwardly closing flaps cooperating with said openings.

9. A means for enhancing the growth of plants comprising a sheet of flexible material having an inner layer of fibers treated with heat-absorbing water-resistant material and two outer layers of fibrous fabric, said sheet having relatively small rents or tears forming drainage openings distributed through its body, and upwardly closing flaps cooperating with said openings.

In witness whereof I have signed my name to this specification.

CHARLES F. ECKART.